United States Patent [19]

Fujii et al.

[11] Patent Number: 5,559,186

[45] Date of Patent: Sep. 24, 1996

[54] THERMOPLASTIC RESIN COMPOSITIONS COMPRISING BLENDS OF POLYPHENYLENE ETHER AND POLYSTYRENE COPOLYMER RESINS

[75] Inventors: Takeshi Fujii, Sodegaura; Yasuro Suzuki, Kisarazu; Hayato Kihara; Takashi Anbo, both of Ichihara, all of Japan

[73] Assignee: Sumitomo Chemical Company, Limited, Osaka, Japan

[21] Appl. No.: 413,158

[22] Filed: Mar. 29, 1995

[30] Foreign Application Priority Data

Mar. 31, 1994 [JP] Japan .................... 6-063022

[51] Int. Cl.$^6$ .................... C08L 25/08; C08L 71/12
[52] U.S. Cl. .................... 525/68; 525/92 D; 525/133; 525/905
[58] Field of Search .................... 525/68, 92 D, 525/133, 905

[56] References Cited

U.S. PATENT DOCUMENTS

| | | | |
|---|---|---|---|
| 4,617,346 | 10/1986 | Sonoda | 525/68 |
| 4,684,696 | 8/1987 | Bates et al. | 525/68 |
| 5,091,256 | 2/1992 | Bopp et al. | 521/60 |
| 5,132,363 | 7/1992 | Furuta et al. | 525/92 D |
| 5,159,004 | 10/1992 | Furuta et al. | 525/93 |

FOREIGN PATENT DOCUMENTS

| | | |
|---|---|---|
| A1-305764 | 3/1989 | European Pat. Off. . |
| A2-476366 | 3/1992 | European Pat. Off. . |
| 0530535 | 3/1993 | European Pat. Off. . |
| 0534196 | 3/1993 | European Pat. Off. . |
| A3-530535 | 3/1993 | European Pat. Off. . |
| 1252607 | 10/1989 | Japan . |

*Primary Examiner*—Thomas Hamilton, III
*Attorney, Agent, or Firm*—Cushman Darby & Cushman, L.L.P.

[57] ABSTRACT

A thermoplastic resin composition having excellent appearance and moldability contains:

(A) 1 to 99% by weight of a polyphenylene ether resin, (B) 99 to 1% by weight of a polystyrene resin prepared by copolymerization of: (i) a styrene compound, 100 to 500 ppm by weight of a compound containing 2-6 vinyl groups, and if necessary, a compound capable of copolymerizing with the styrene compound, or (ii) a polystyrene resin obtained by copolymerization of a styrene compound, 100 to 500 ppm by weight of a compound containing 2-6 vinyl groups, a first rubber, and if necessary, a compound capable of copolymerizing with said styrene compound, or a mixture of (i) and (ii). Component (C) is a second rubber which can be present in amounts of about 0 to 100 parts by weight relative to (A) and (B).

20 Claims, No Drawings

THERMOPLASTIC RESIN COMPOSITIONS COMPRISING BLENDS OF POLYPHENYLENE ETHER AND POLYSTYRENE COPOLYMER RESINS

BACKGROUND OF THE PRESENT INVENTION

1. Field of the Invention

The present invention relates to a thermoplastic resin composition comprising a polyphenylene ether resin and a new polystyrene resin.

More particularly, the present invention relates to a thermoplastic resin blended composition having simultaneously excellent mechanical properties, flowability, and appearance for molded articles prepared therefrom.

2. Description of Related Art

Polyphenylene ether resin is a thermoplastic material prepared by various methods from various phenols and has excellent physical properties such as, for example, dimensional stability and dielectric properties.

However, uses of polyphenylene ether resin are restricted due to, for example, inferior processability, impact strength, and solvent stability.

Therefore, blending of polyphenylene ether resin with other polymers has been attempted to improve processability, impact strength and solvent stability.

For example, a resin composition comprising a polyphenylene ether resin and one or more kinds of polystyrene resins is illustrated in U.S. Pat. No. 3,383,435. A resin composition comprising the polyphenylene ether resin and a rubber-modified polystyrene is illustrated in U.S. Pat. No. 3,819,761. However, these resin compositions have insufficient flowability.

A polyphenylene ether resin composition comprising an impact resistant rubber-modified polystyrene and low molecular weight styrene homopolymer (number average molecular weight: 30,000 to 60,000) is illustrated in U.S. Pat. No. 3,960,808. However, although the flowability of the resin composition is improved, the resin still has decreased impact strength.

Furthermore, when the conventional polyphenylene ether resin composition is molded, inferior appearances such as weld lines, flow marks, and break out (stand out) are problematic. It is desired to solve these and other problems in accordance with shortening of the molding cycle and thinning of molded articles produced from these resins.

SUMMARY OF THE INVENTION

The resin composition of the present invention comprises a polyphenylene ether resin and a new polystyrene resin. The new resin composition of the present invention retains desirable mechanical properties and, in addition, has excellent flowability. Moreover, molded articles of the composition of the present invention have excellent appearance.

More specifically, the present invention relates to a thermoplastic resin composition comprising:

(A) 1 to 99% by weight of a polyphenylene ether resin, (B) 99 to 1% by weight of: (i) a polystyrene resin prepared by copolymerization of (a) a styrene compound, (b) 100 to 500 ppm by weight (with respect to the styrene compound) of a compound containing 2–6 vinyl groups, and (c) optionally, a compound capable of copolymerizing with the styrene compound, where compounds (b) and (c) are different, (ii) a polystyrene resin prepared by copolymerization of (a) a styrene compound, (b) 100 to 500 ppm by weight (with respect to the styrene compound) of a compound containing 2–6 vinyl groups, (c) a compound capable of copolymerizing with the styrene compound, and (d) a first rubber, where compounds (b) and (c) are different, or (iii) a mixture of the polystyrene resins (i) and (ii).

In the present invention, the polystyrene component (B) has a weight average molecular weight of about 150,000–1,000,000. The number of branching points in polystyrene component (B) (excluding any first rubber in component (B) in the z-average molecular weight is about 2 to 20. The percentages of components (A) and (B) are relative to the total amount of components (A) and (B), and the percentages of components (A) and (B) must total 100%.

The composition of the present invention can further comprise a second rubber, component (C), in amounts of 0 to 100 parts by weight per 100 parts by weight of the total amount of (A) and (B). The first and second rubbers of the present invention can be the same rubbers or can be different rubbers.

For purposes of calculating the amount of (C), when (B) does not contain the first rubber, the amount of the (C) is simply calculated relative to the sum of the amounts of components (A) and (B). However, when (B) does contain the first rubber, the amount of (B) excludes the amount of the first rubber, and the amount of the first rubber is added to the amount of the second rubber.

DETAILED DESCRIPTION OF THE PRESENT INVENTION

The polyphenylene ether resin (A) used in the present invention can be a polymer or copolymer obtained by oxidative polymerization of one or more phenolic compounds represented by Formula I.

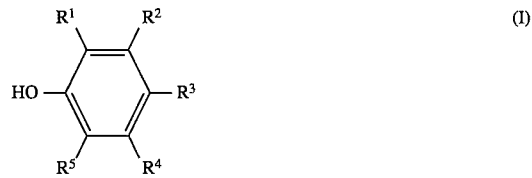

$R^1$, $R^2$, $R^3$, $R^4$, and $R^5$ can each be a hydrogen atom, a halogen atom, a hydrocarbon group or a substituted hydrocarbon group, but at least one of $R^1$–$R^5$ is a hydrogen. Either oxygen or an oxygen containing gas is used in conjunction with the oxidative-coupling catalysts for polymerization. Examples of $R^1$, $R^2$, $R^3$, $R^4$, and $R^5$ in the above-mentioned Formula I include, but are not limited to hydrogen, chlorine, bromine, fluorine, iodine, ethyl, n-propyl, iso-propyl, n-butyl, sec-butyl, or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of compounds represented by Formula I include phenol; o-, m-, or p-cresol; 2,6-,2,5-, 2,4- or 3,5-dimethylphenol; 2-methyl-6-phenylphenol; 2,6-diphenylphenol; 2,6-diethylphenol; 2-methyl-6-ethylphenol; 2,3,5-,2,4,6-trimethylphenol; 2,3,6- or 3-methyl-6-t-butylphenol; thymol and 2-methyl-6-allylphenol. Furthermore, any phenolic compounds represented by Formula I can be used. Other phenolic compounds can be used such as, for example, polyhydric hydroxy aromatic compounds like bisphenol-A, tetrabromobisphenol-A, resorcin, hydroquinone and novolac resins. Preferable phenolic compounds are 2,6-dimethylphenol, 2,6-diphenylphenol, 3-methyl-6-t-butylphenol and 2,3,6-trimethylphenol.

Any oxidative coupling catalyst can be employed for oxidative polymerization of the phenolic compound, as long as the catalyst has the ability to polymerize the phenolic compound.

Preparation methods for the polyphenylene ether resin are described in, for example, U.S. Pat. Nos. 3,306,874, 3,306,875, and 3,257,357, the complete disclosures of which are incorporated herein by reference. Other preparation methods are illustrated in, for example, Japanese Examined Patent Publication (Koukoku) No. 17880/1977 and Japanese Unexamined Patent Publications (Koukai) No. 51197/1975 and (Koukai-Hei) No. 304119/1989, the complete disclosures of which are incorporated herein by reference.

Examples of the polyphenylene ether resin (A) of the present invention include but are not limited to, poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly (2,6-dipropyl-1,4 -phenylene ether), poly(2-ethyl-6-propyl-1,4-phenylene ether), poly(2,6-butyl-1,4-phenylene ether), poly(2,6-dipropenyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4 -phenylene ether), poly(2-ethyl-6-stearyloxy-1,4-phenylene ether), poly(2-methyl-6-phenyl-1,4-phenylene ether), poly(2-methyl-1,4-phenylene ether), poly(2-ethoxy-1,4-phenylene ether), poly(2-chloro-1,4-phenylene ether), poly(3-methyl-6-t-butyl-1,4-phenylene ether), poly(2,6-dichloro-1,4-phenylene ether), poly(2,5-dibromo-1,4-phenylene ether), and poly(2,6-dibenzyl-1,4-phenylene ether).

Moreover, copolymers of any of the phenolic compounds represented by Formula I and mentioned hereinbefore can be used.

For example, copolymers can include copolymers of 2,6-dimethylphenol and multi-substituted phenols such as 2,3,6-trimethylphenol and 2,3,5,6-tetramethylphenol.

Poly(2,6-dimethyl-1,4-phenylene ether) and a copolymer of 2,6-dimethylphenol and 2,3,6-trimethylphenol are preferred as polyphenylene ether (A).

The molecular weight of the polyphenylene ether resin (A) of the present invention can be varied according to the use. Generally, the molecular weight expressed by intrinsic viscosity measured in chloroform at 30° C. will be about 0.1–0.7 dl/g, and preferably, about 0.4–0.6 dl/g, and more preferably, about 0.45–0.6 dl/g.

The polyphenylene ether resin of the present invention can be a graft copolymer. For example, a styrene monomer such as styrene, o-methyl styrene, p-methylstyrene, vinyltoluene, chlorostyrene, or the like can be grafted onto the above-mentioned polymers and copolymers.

The polystyrene resin (B) of the present invention may contain a conventional general purpose polystyrene resin (GPPS), a conventional rubber-modified high impact polystyrene (HIPS) and mixtures thereof.

The styrene monomer compound constituting the polystyrene resin can be, for example, α-substituted alkylstyrenes like styrene or α-methylstyrene, and nuclearly substituted alkylstyrenes like p-methylstyrene.

The compound having 2–6 vinyl groups as a monomer unit constituting the polystyrene resin in combination with the styrene compound at the polymerization can be, for example, a compound having at least two vinyl groups. Preferably, the compound has 2–6 vinyl groups, and more preferably, 2–4 vinyl groups.

The compound having at least two vinyl groups can be, for example, aromatic divinyl compounds such as divinylbenzene, and/or polyvalent acrylates.

Exemplary polyvalent acrylates include: diacrylates such as polyethyleneglycol diacrylate, 1,3-butyleneglycol diacrylate, 1,6-hexaneglycol diacrylate, neopentylglycol diacrylate, polypropyleneglycol diacrylate, 2,2-bis-(4-acryloxypropyloxyphenyl)propane and 2,2-bis-(4-acryloxydiethoxyphenyl)propane; dimethacrylates such as ethyleneglycol dimethacrylate, diethyleneglycol dimethacrylate, triethyleneglycoldimethacrylate, polyethyleneglycol dimethacrylate, 1,3-butyleneglycol dimethacrylate, 1,4-butyleneglycol dimethacrylate, 1,6-hexaneglycol dimethacrylate, neopentylglycol dimethacrylate, dipropyleneglycol dimethacrylate, polypropyleneglycohol dimethacrylate and 2,2-bis-(4-methacryloxydiethoxyphenyl)propane; triacrylates such as trimethylolpropane triacrylate and trimethylolethane triacrylate; trimethacrylates such as trimethylolpropane trimethacrylate and trimethylolethane trimethacrylate; and tetraacrylates such as tetramethylolmethane tetraacrylate; tetramethacrylates such as tetramethylolmethane tetramethacrylate.

Divinylbenzene and polyvalent acrylate are preferred.

For component (B), about 100 to 500 ppm by weight, and preferably, about 100 to 400 ppm by weight, and more preferably about 100 to 300 ppm by weight, of the compound having 2–6 vinyl groups is used per 100% by weight of the styrene compound.

When the amount of compound having 2–6 vinyl groups is less than 100 ppm by weight, the number of branching points in the z-average molecular weight of the polystyrene resin specified in the present invention is not obtained. On the other hand, when the amount exceeds 500 ppm by weight, flowability and appearance of the molded articles become inferior.

The first rubber in the polystyrene resin, can be, for example, polybutadiene, styrene-butadiene copolymer, and ethylene-propylene-non-conjugated diene terpolymer. In particular, polybutadiene and styrene-butadiene copolymer are preferred.

The polybutadiene of this first rubber can have high, medium, or low contents of cis- and trans-polybutadiene. The polybutadiene can have, for example, 1,2-polybutadiene or 1,4-polybutadiene units.

The blending amount of the first rubber can be about 1 to 50 parts by weight per 100 parts by weight of the styrene compound.

In addition to the styrene compound and the compound having 2–6 vinyl groups, a compound capable of copolymerizing with the styrene compound can be used such as, for example, vinyl monomers like acrylonitrile, methacrylonitrile, methacrylic acid and methylmethacrylate, as well as maleic anhydride, maleimide and nuclearly substituted maleimide.

The blending amount of the compound copolymerizable with the styrene compound can be about 0 to 150 parts by weight per 100 parts by weight of the styrene compound.

The weight average molecular weight of the polystyrene resin used in the present invention can be about 150,000–1,000,000, and preferably, about 50,000–600,000, and more preferably, about 50,000–380,000. When the weight average molecular weight is less than about 150,000, desired properties are not obtained, but when it exceeds about 1,000,000, the flowability decreases remarkably.

The weight average molecular weight of the present invention is determined with use of a differential refractometer and a gel permeation chromatograph (GPC) according to the following procedure.

About 0.5 g of the polystyrene resin was dissolved in methylethyl ketone (MEK)/methanol (MeOH) mixed solvent (MEK/MeOH =10/1 by volume). Then, a soluble fraction and an insoluble fraction (which is largely the rubber component of the rubber-modified polystyrene resin) were separated by centrifugation. The supernatant liquid was decanted from the insoluble fraction and poured into 500 ml of methanol with stirring to precipitate the polymer. The polymer was filtered with use of a glass filter (GS25), and methanol was removed by drying. The resultant dried sample was dissolved in tetrahydrofuran to make a sample solution (0.5 mg/ml) for measurement.

The weight average molecular weight of the polystyrene resin was determined by GPC using the sample solution. The weight average molecular weight was calculated with use of a working curve obtained from standard polystyrene samples having specified molecular weights.

The number of branching points in the z-average molecular weight of the polystyrene resin used in the present invention is about 2–20, and preferably about 2–15, and more preferably about 3–10.

If the number of branching points is less than about 2, the flowability of the ultimate blend is inferior. If the number of branching points exceeds about 20, both the flowability of the ultimate blend and the appearance of a molded article made therefrom become poor.

It is believed that the number of branching points in the z-average molecular weight might correspond to the number of branching points in molecular chains representing the higher molecular weight fraction. The higher molecular weight fraction is believed to lower the flowability of a polystyrene resin having a given molecular weight distribution. The number of branching points in the z-average molecular weight is determined by the following procedure.

The number of branching points in the z-average molecular weight was determined by the viscosity-GPC method using a GPC equipped with a differential refractometer and a viscometer as detectors.

A detailed description of the measurement of the number of branching points in the z-average molecular weight is provided in *Journal of the Society of Rubber Industry, Japan*, Vol. 45, No. 2, pp. 105–118 (1972), the complete disclosure of which is incorporated herein by reference.

The solvent and sample concentration for measurement were the same as in the measurement of the weight average molecular weight described previously herein.

The number of branching points of a certain molecular weight M, $B_n(M)$, was calculated from the following equation:

$$[IV(M)/IV_L(M)]^{2/3} = [(1+B_n(M)/7)^{1/2} + 4/9 B_n(M)]^{-1/2}$$

wherein $IV(M)$ and $IV_L(M)$ are respectively the intrinsic viscosity of the test sample and a linear polystyrene as a standard sample measured by the viscosity-GPC method. The number of branching points in the z-average molecular weight is the value in the z-average molecular weight obtained from the numbers of branching points at each molecular weight determined by the viscosity-GPC method.

The melt flow rate of the polystyrene resin of the present invention is preferably about 0.1 to 50 g/10 min.

The polystyrene resin used in the present invention can be produced, for example, by a batchwise suspension polymerization process or a continuous bulk polymerization process.

It is better that the styrene compound and the compound containing 2–6 vinyl groups are homogeneously mixed beforehand and that the mixture of solution is polymerized until the conversion rate reaches preferably 60% by weight or more, and more preferably, 70% by weight or more.

Both a thermal polymerization method or a polymerization method by a radical initiator can be used. Any of the various radical initiators known to those skilled in the art can be used as the initiator for polymerization.

The polymerization reactor vessel can be, for example, a thorough-mixing type polymerization vessel with a stirrer, a plug-flow type flooded (vertical or horizontal) polymerization vessel, a static-mixing tube type polymerization vessel or a combination of those vessels.

The polystyrene resin used in the present invention can be a rubber-modified polystyrene as mentioned before. The rubber-modified polystyrene can be produced, for example, by a bulk polymerization process or a bulk suspension polymerization process.

For example, either a solution prepared by (i) dissolving 1 to 50 parts by weight of the rubber in 100 parts by weight of the styrene compound, or (ii) adding toluene and/or ethylbenzene as diluents to the solution (i), can be supplied continuously to the thorough-mixing type polymerization vessel with a stirrer. The solution is polymerized until the conversion reaches preferably 20 to 50% by weight, and more preferably, 25 to 45% by weight (first polymerization step). The resultant polymer mixture can be sent to a connected polymerization vessel.

Successively, after 100 to 500 ppm of the compound containing 2–6 vinyl groups per 100% by weight of the styrene compound is homogeneously mixed, the polymerization is conducted until the final conversion rate reaches preferably at least about 60% by weight, and more preferably, at least about 70% by weight (second polymerization step).

Of course, the compound having 2–6 vinyl groups can be added to the polymerization solution in either the first polymerization step, the second polymerization step, or both steps.

However, the preparation methods of the rubber-modified polystyrene are not restricted to these methods.

The particle diameter of the first rubber in the rubber-modified polystyrene is preferably about 0.1 to 10 μm, and more preferably, about 0.2 to 5 μm.

The second rubber (C) used in the present invention is thought to improve the impact strength of the composition. The rubber can be natural or synthetic polymer materials that are elastic at room temperature. Exemplary second rubbers include: ethylene-α-olefin copolymer rubbers such as ethylene-propylene copolymer rubber and ethylene-1-butene copolymer rubber; ethylene-α-olefin-non-conjugated diene copolymer rubbers such as ethylene-propylene-non-conjugated diene copolymer rubber; polybutadiene rubber; polyurethane rubber; styrene-butadiene copolymer rubber; styrene block copolymer rubbers such as, for example, block copolymer rubbers having styrene block (S) and butadiene block (Bd) such as SBd block copolymer, SBdS block copolymer and SBdSBdS block copolymer, a block copolymer rubber having styrene block (S) and hydrogenated butadiene block (Bd'), a block copolymer rubber having styrene block (S) and isoprene block (I) and a block copolymer rubber having styrene block (S) and hydrogenated isoprene block (I').

The second rubber can be mixtures thereof, or rubbers modified with a functional monomer containing, for example, acid or epoxy functionalities.

Use of polybutadiene, styrene-butadiene copolymer rubber, styrene block copolymer rubber, or mixtures thereof is preferred.

Among the styrene block copolymer rubbers, the block copolymer rubber having styrene block (S) and butadiene block (Bd) and the block copolymer rubber having styrene block (S) and hydrogenated butadiene block (Bd') are preferred.

As a preparation method of the styrene block copolymer rubber, many methods known to those skilled in the art can be used. For example, the block copolymer rubber having styrene block (S) and butadiene block (Bd) can be prepared by block copolymerization using lithium catalyst or Ziegler catalyst in an inert solvent, as referred to in Japanese Examined Patent Publication (Koukoku) No. 2798/1965, the complete disclosure of which is incorporated herein by reference.

The block copolymer having styrene and butadiene blocks can be, for example, CARIFLEX® TR 1101 by Shell Chemical Company Ltd.

The hydrogenation treatment of these block copolymer rubbers can be performed, for example, in the presence of a hydrogenation catalyst in an inert solvent, as referred to in Japanese Examined Patent Publications (Koukoku) No. 8704/1967, No. 6636/1968 and No. 20814/1971, the complete disclosures of which are incorporated herein by reference.

The degree of hydrogenation is preferably at least about 50%, and more preferably, about 80% or more, of the butadiene block (Bd), and preferably, about 25% or less of styrene block (S).

As the hydrogenated block copolymer, KRATON-G® by Shell Chemical Company is exemplary.

As the styrene block copolymer rubber, the number average molecular weight of the styrene block copolymer rubber is preferably about 10,000 to 1,000,000, and more preferably, about 20,000 to 300,000.

The number average molecular weight of styrene block (S) in the block copolymer rubber is preferably about 1,000–200,000, and more preferably, about 2,000–100,000. The number average molecular weight of butadiene block (Bd) is preferably about 1,000–200,000, and more preferably about 2,000–100,000 and the weight ratio of the styrene block (S) to butadiene block (Bd) [(S)/(Bd)] is preferably about 2/98–60/40, and more preferably, about 10/90–40/60.

When the styrene block copolymer rubber is the block copolymer having styrene block (S) and hydrogenated butadiene block (Bd'), the number average molecular weight of the styrene block (S) is preferably about 1,000–200,000, and more preferably, about 2,000–100,000 and the number average molecular weight of the hydrogenated butadiene block (Bd') is preferably about 1,000–200,000, and more preferably, about 2,000–100,000, and the weight ratio of the styrene block (S) to hydrogenated butadiene block (Bd') [(S)/(Bd')] is preferably about 2/98–60/40, and more preferably, about 10/90–40/60.

In the thermoplastic resin composition of the present invention, the polyphenylene ether resin is blended in amounts of about 1–99% by weight, and preferably, about 10–90% by weight, and more preferably, about 20–80% by weight. The polystyrene resin is blended in amounts of about 99 - 1% by weight, and preferably about 90 - 10% by weight, and more preferably, about 80 - 20% by weight. The individual amounts of (A) and (B) in the thermoplastic resin are relative to the sum of the amounts of (A) and (B), and the individual amounts of (A) and (B) must total 100% by weight.

If the thermoplastic resin composition has an amount of polyphenylene ether resin less than about 1% by weight, the thermal resistance is not adequate, and if it exceeds about 99% by weight, the flowability is inferior.

When the rubber-modified polystyrene is used as the polystyrene resin (B), the amount of the second rubber (C) includes the weight of the first rubber in the rubber modified polystyrene (B) for calculation of the weight of the rubber (C).

About 0–100 parts by weight, and preferably, about 0–60 parts by weight, and more preferably, about 0–30 parts by weight of the rubber (C) are used per 100 parts by weight of the sum of the polyphenylene ether resin (A) and the polystyrene resin (B), wherein, when (B) is the rubber-modified polystyrene, the weight of the polystyrene resin (B) is the weight excluding the weight of said rubber in it.

If the amount of rubber exceeds about 100 parts by weight, the thermal resistance and the rigidity are not adequate. If the component (C) is present, the preferred amount is about 1–30 parts by weight, and more preferably, about 5–25 parts by weight.

Other polymer compounds and property enhancing agents can be added to the thermoplastic resin composition of the present invention. Other polymer compounds that can be added include, for example, a linear polystyrene having no branching; polyolefins such as polypropylene, high density polyethylene, low density polyethylene, linear low density polyethylene, propylene-ethylene copolymer, ethylene-1-butene copolymer, ethylene-1-pentene copolymer, ethylene-1-hexene copolymer and poly-4-methyl-1-pentene; copolymers of olefins and vinyl compounds copolymerizable with olefins like acrylates, methacrylates, vinyl acetate, styrene, acrylonitrile and glycidyl (meth)acrylate]; polymers such as polyvinylchloride, polymethylmethacrylate, polyvinylacetate, polyvinylpyridine, polyvinylcarbazole, polyacrylamide and polyacrylonitrile; condensation polymer compounds such as polycarbonate, polysulfone, polyethersulfone, polyethylene terephtharate, polybutylene terephtharate, polyarylene ester (for example, U polymer by Unitika Company Ltd.), polyphenylene sulfide, polyamides such as 6-nylon, 6,6-nylon and 12-nylon, and polyacetal. Furthermore, various resins such as silicone resin, fluorine resin, polyimide, polyamideimide, phenol resin, alkyd resin, unsaturated polyester resin and Dapon resin can be used.

A filler can be added. The filler can be, for example, fibers for reinforcement such as glass fiber, carbon fiber, aramid fiber, aluminum and stainless steel, and metal whisker; or inorganic fillers such as silica, alumina, calcium carbonate, talc, mica, clay, kaolinite, magnesium sulfate, carbon black, $TiO_2$ and $ZnO$.

Fillers such as carbon fiber, metal fiber and carbon black decrease surface resistivity and volume resistivity, and can give electro conductivity to the thermoplastic resin composition.

Additional exemplary additives for the present invention include, as known to those skilled in the art, flame retardants and flame retarding assistants such as halogen compounds, phosphoric esters (for example, triphenylphosphate) and $Sb_2O_3$; mineral oils; other lubricants; plasticizers such as phthalates; dyes; pigments; antistatic agents; anti-oxidant agents; and weather-resistant agents.

The method for preparing the thermoplastic resin composition of the present invention is not restricted particularly. For example, solution-blending and melt-kneading can be used. Among these, melt-kneading is preferred.

When the melt-kneading method is used, the temperature of melt-kneading can be about 150°–400° C., and preferably about 200°–350° C., and more preferably, about 200°–300° C.

When the melt-kneading method is used, any order of kneading each component can be used.

For example, when mixtures are melt-kneaded by using an extruder, any of the following exemplary methods can be used: (1) the components (A)–(C) are added all at once and melt-kneaded; (2) the component (A) and the component (B) are melt-kneaded in advance and the component (C) is added additionally and melt-kneaded; (3) the component (A) and the component (C) are melt-kneaded in advance and the component (B) is added additionally and melt-kneaded; or (4) the component (B) and the component (C) are melt-kneaded in advance and the component (A) is added additionally and melt-kneaded.

Uses of the thermoplastic resin composition of the present invention include, for example, various cases, frames, connectors, switches, and other mechanism parts in electric, electronics, or OA (office automation) fields; door-mirror stays, lamp reflectors, various gears in automobile or vehicle fields; and various housings, pulleys, and handles in mechanical fields.

A thermoplastic resin composition comprising a polyphenylene ether resin and a new polystyrene resin, which resin has excellent mechanical, processing, and molding properties, has been described in Patent Application No. 6-63022 filed in Japan on Mar. 31, 1994, the complete disclosure of which is incorporated herein by reference.

EXAMPLES

The present invention is described further by the following non-limiting Examples. The meanings of abbreviations appearing in the Examples and Comparative Examples are:

(1) PPE 1: Polyphenylene Ether Resin

Poly(2,6-dimethyl-1,4-phenylene ether) is used having intrinsic viscosity measured in chloroform at 30° C. of 0.46 dl/g.

(2) B-PS-1: Polystyrene Resin

A liquid mixture of 95 % by weight of styrene, 5 % by weight of ethylbenzene and 200 ppm by weight of divinylbenzene was sent to a thorough-mixing type polymerization vessel equipped with a stirrer. The liquid was polymerized until the conversion of 65% by weight was reached at a polymerization temperature of 150 ° C. Unreacted monomer was then removed in a degassing vessel at 250° C., and the polystyrene resin B-PS-1 was obtained.

The weight average molecular weight was $35 \times 10^4$. The number of branching points in the z-average molecular weight was 3.4. The melt flow rate (g/10 min.) was 3.2 (Measurement condition for melt flow rate: 200° C., 5 kg loading, according to JIS K 7210).

(3) B-PS-2: Rubber-Modified Polystyrene

A mixture comprising 5.5 % by weight of middle-cis-polybutadiene (Diene 55 AS by Asahi Kasei Company Ltd.; middle relates to the amount of cis content), 90 % by weight of styrene, 4 % by weight of ethylbenzene, 0.5 % by weight of mineral oil, 0.03 % by weight of t-dodecylmercaptan and 340 ppm by weight of divinylbenzene was sent in liquid form to a thorough-mixing type polymerization vessel equipped with a stirrer and was polymerized until a conversion of 30 % by weight was reached at a polymerization temperature of 140° C. with a stirring speed of 150 rpm.

The thus obtained mixture was then polymerized at 140° to 160° C. in a flooded type polymerization vessel until a conversion of 75 % by weight was reached. After that, volatile matter was eliminated in a degassing vessel at 250° C. and the rubber-modified polystyrene B-PS-2 was obtained. The B-PS-2 sample had the following characteristics:

| | |
|---|---|
| Weight average molecular weight | $23.5 \times 10^4$ |
| Number of branching points in the z-average molecular weight | 5.6 |
| Final rubber amount | 7.3 wt. % |
| The particle diameter of the rubber (weight average) | 0.7 μm |
| Melt flow rate (g/10 min.) (Measurement condition: 200° C., 5 kg loading, according to JIS K 7210) | 4.7 |

(4) B-PS-3: Polystyrene Resin

A mixture was polymerized by the same manner as for the preparation of B-PS-1 except that, instead of 200 ppm by weight, 700 ppm by weight of divinylbenzene was used and the polystyrene resin (B-PS-3) was obtained. B-PS-3 had the following characteristics:

| | |
|---|---|
| Weight average molecular weight | $110 \times 10^4$ |
| The number of branching points in the z-average molecular weight | 25.0 |
| Melt flow rate (g/10 min.) (Measurement condition: 200° C., 5 kg loading, according to JIS K 7210) | 0.2 |
| (5) GPPS-1: Polystyrene resin ESBRITE ® E197N by Sumitomo Chemical Company Ltd. | |
| Weight average molecular weight | $35 \times 10^4$ |
| The number of branching points in the z-average molecular weight | 0 |
| Melt flow rate (g/10 min.) (Measurement condition: 200° C., 5 kg loading, according to JIS K 7210) | 1.5 |
| (6) GPPS-2: Polystyrene resin ESBRITE ® E163N by Sumitomo Chemical Company Ltd. | |
| Weight average molecular weight | $21 \times 10^4$ |
| The number of branching points in the z-average molecular weight | 0 |
| Melt flow rate (g/10 min.) (Measurement condition: 200° C., 5 kg loading, according to JIS K 7210) | 6.8 |

(7) HIPS-1: Rubber-Modified Polystyrene

A mixture was polymerized by the same manner as in B-PS-2 except that 0.01 % by weight of t-dodecylmercaptan and no divinylbenzene were used and the rubber modified polystyrene (HIPS-1) was obtained.

| | |
|---|---|
| Weight average molecular weight | $20.5 \times 10^4$ |
| The number of branching points in the z-average molecular weight | 0 |
| The final rubber amount | 7.3 wt. % |
| The particle diameter of the rubber (weight average) | 0.7 μm |
| Melt flow rate (g/10 min.) | 3.5 |

-continued (Measurement condition:
200° C., 5 kg loading,
according to JIS K 7210)

(8) SBS-1: Styrene-Butadiene-Styrene (SBdS) Block Copolymer Rubber

CARIFLEX® TR 1101 by Shell Chemical Company.

Property measurement methods were carried out as follows.

(1) Izod Impact Strength and Flexural Modulus

The components shown in Table 1 were blended, and pellets prepared by melt kneading with twin-screw kneader were injection molded to obtain test pieces of 3.2 mm thickness. Izod impact strength and flexural modulus were measured respectively in accordance with ASTM D256 and D790 by using the test pieces.

(2) Melt Flow Rate (MFR)

MFR was measured at 280° C., 10 kg loading in accordance with JIS K 7210.

(3) Appearance of Molded Article

Flat plates (90 mm × 150mm × 2mm) were obtained by injection molding at a cylinder temperature of 260° C., and their appearances were evaluated by visual inspection as follows:
Excellent: Surface with smoothness and brilliance.
Good: Surface with smoothness and slight inferiority in brilliance as compared with Excellent.
Average: Surface with inferiority in smoothness and brilliance as compared with Good.
Bad: Surface with inferiority in smoothness and no brilliance.

Example 1

The thermoplastic resin composition was prepared by melt-kneading 50 parts by weight of the PPE 1 and 50 parts by weight of the B-PS-1 thrown from a hopper into a continuous twin-screw kneader (TEX-44 type by Nippon Steel Works Company Ltd.) settled at a cylinder temperature of 260 ° C. and screw revolution numbers of 330 rpm. The thus obtained composition was molded at 260° C. by injection molding, and test pieces were prepared and their properties and appearances were evaluated.

The blend ratio and the measurement results of properties are shown respectively in Table 1 and Table 2.

Comparative Example 1

The composition was prepared by the same manner as in Example 1 except that, instead of the B-PS-1, the GPPS-1 was used, and test pieces were made and evaluated.

The blend ratio and the measurement results of properties are shown respectively in Table 1 and Table 2.

Comparative Example 2

The composition was prepared by the same manner as in Example 1 except that, instead of the B-PS-1, the GPPS-2 was used, and test pieces were made and evaluated.

The blend ratio and the measurement results of properties are shown respectively in Tables 1 and 2.

Comparative Example 3

The composition was prepared by the same manner as in Example 1 except that, instead of the B-PS-1, the B-PS-3 was used, and test pieces were made and evaluated.

The blend ratio and the measurement results of properties are shown respectively in Tables 1 and 2.

Example 2

The composition was prepared by the same manner as in Example 1 except that, furthermore, 10 parts by weight of the SBS-1 was added, and test pieces were made and evaluated.

The blend ratio and the measurement results of properties are shown respectively in Tables 1 and 2.

Comparative Example 4

The composition was prepared by the same manner as in Example 2 except that, instead of the B-PS-1, the GPPS-1 was used, and test pieces were made and evaluated.

The blend ratio and the measurement results of properties are shown respectively in Tables 1 and 2.

Example 3

The composition was prepared by the same manner as in Example 1 except that, instead of the B-PS-1, the B-PS-2 was used, and test pieces were made and evaluated.

The blend ratio and the measurement results of properties are shown respectively in Tables 1 and 2.

Comparative Example 5

The composition was prepared by the same manner as in Example 3 except that, instead of the B-PS-2, the HIPS-1 was used, and test pieces were made and evaluated.

The blend ratio and the measurement results of properties are shown respectively in Tables 1 and 2.

While the invention has been described in detail and with reference to specific embodiments thereof, it will be apparent to those of ordinary skill in the art that various changes and modifications can be made therein without departing from the spirit and scope thereof.

TABLE 1

| | Blend ratio (parts by weight) | | | | | | | |
| --- | --- | --- | --- | --- | --- | --- | --- | --- |
| | PPE 1 | B-PS-1 | B-PS-2 | B-PS-3 | GPPS-1 | GPPS-2 | HIPS-1 | SBS-1 |
| Example 1 | 50 | 50 | — | — | — | — | — | — |
| Comparative Example 1 | 50 | — | — | — | 50 | — | — | — |

TABLE 1-continued

|  | Blend ratio (parts by weight) | | | | | | |
| --- | --- | --- | --- | --- | --- | --- | --- |
|  | PPE 1 | B-PS-1 | B-PS-2 | B-PS-3 | GPPS-1 | GPPS-2 | HIPS-1 | SBS-1 |
| Comparative Example 2 | 50 | — | — | — | — | 50 | — | — |
| Comparative Example 3 | 50 | — | — | 50 | — | — | — | — |
| Example 2 | 50 | 50 | — | — | — | — | — | 10 |
| Comparative Example 4 | 50 | — | — | — | 50 | — | — | 10 |
| Example 3 | 50 | — | 50 | — | — | — | — | — |
| Comparative Example 5 | 50 | — | — | — | — | — | 50 | — |

TABLE 2

|  | Flexural modulus (kg/cm$^2$) | Izod impact strength (kg-cm/cm) | MFR (g/10 min.) | Appearance of molded articles |
| --- | --- | --- | --- | --- |
| Example 1 | 34,000 | 3.0 | 32 | Excellent |
| Comparative Example 1 | 34,000 | 2.5 | 25 | Average |
| Comparative Example 2 | 34,000 | 1.9 | 31 | Bad |
| Comparative Example 3 | 34,000 | 1.2 | 4 | Bad |
| Example 2 | 24,000 | 10 | 28 | Excellent |
| Comparative Example 4 | 24,000 | 10 | 22 | Average |
| Example 3 | 26,000 | 7 | 35 | Excellent |
| Comparative Example 5 | 26,000 | 7 | 25 | Average |

What is claimed is:

1. A thermoplastic resin composition comprising:
    (A) 1 to 99% by weight of a polyphenylene ether resin,
    (B) 99 to 1% by weight of:
        (i) a polystyrene resin prepared by copolymerization of: (a) a styrene compound, (b) about 100–500 ppm by weight of with respect to said styrene compound a compound containing 2–6 vinyl groups, and (c) optionally, a compound capable of copolymerizing with said styrene compound, wherein compounds (b) and (c) are different,
        (ii) a polystyrene resin prepared by copolymerization of (a) a styrene compound, (b) about 100–500 ppm by weight of with respect to said styrene compound a compound containing a 2–6 vinyl groups, (c) optionally, a compound capable of copolymerizing with said styrene compound, and (d) a first rubber, wherein compounds (b) and (c) are different, or
        (iii) a mixture of polystyrene resins (i) and (ii),
    wherein said polystyrene resin (B) has a weight average molecular weight of about 150,000–1,000,000 and a number of branching points in a z-average molecular weight of about 2–15, wherein said percentages of (A) and (B) are with respect to the total amount of (A) and (B), and said percentages of (A) and (B) total 100 percent, and
    (C) 0 to 100 parts by weight of a second rubber per 100 parts by weight of the total amount of (A) and (B), wherein, for purposes of calculating parts by weight of (C), when (B) contains said first rubber, the amount of (B) excludes the amount of said first rubber, and the amount of said first rubber is added to the amount of said second rubber.

2. The thermoplastic resin composition according to claim 1, wherein said polyphenylene ether resin (A) is poly(2,6-dimethyl-1,4-phenylene ether) or a copolymer of 2,6-dimethylphenol and 2,3,6-trimethylphenol.

3. The thermoplastic resin composition according to claim 1, wherein said polyphenylene ether resin (A) has an intrinsic viscosity measured in chloroform at 30° C. of about 0.45–0.6 dl/g.

4. The thermoplastic resin composition according to claim 1, wherein the amount of said compound containing 2–6 vinyl groups is between about 100–300 ppm by weight, and said polystyrene resin has a weight average molecular weight between about 150,000–600,000, and said number of branching points is between about 2–15.

5. The thermoplastic resin composition according to claim 1, wherein said compound containing 2–6 vinyl groups is divinylbenzene, a polyvalent acrylate, or a mixture thereof.

6. The thermoplastic resin composition according to claim 1, wherein said number of branching points in the z-average molecular weight is about 3 to 10.

7. The thermoplastic resin composition according to claim 1, wherein said second rubber (C) is a polybutadiene rubber, a styrene-butadiene copolymer rubber, a styrene block copolymer rubber, or a mixture thereof.

8. The thermoplastic resin composition according to claim 7, wherein said styrene block copolymer rubber is a block copolymer rubber having styrene block (S) and butadiene block (Bd).

9. The thermoplastic resin composition according to claim 8, wherein said styrene block (S) has a number average molecular weight of about 2,000–100,000, said butadiene block (Bd) has a number average molecular weight of about 2,000–100,000, and the weight ratio of (S)/(Bd) is about 10/90–40/60.

10. The thermoplastic resin composition according to claim 7, wherein said styrene block copolymer rubber is a block copolymer rubber having styrene block (S) and hydrogenated butadiene block (Bd').

11. The thermoplastic resin composition according to claim 10, wherein said styrene block (S) has a number average molecular weight of about 2,000 to 100,000, said hydrogenated butadiene block (Bd') has a number average molecular weight of about 2,000–100,000, and the weight ratio of (S)/(Bd') is 10/90–40/60.

12. A thermoplastic resin composition according to claim 1, wherein said compound having 2–6 vinyl groups is limited to compounds having 2–4 vinyl groups.

13. A thermoplastic resin composition according to claim 1, wherein said compound having 2–6 vinyl groups is divinylbenzene.

14. A thermoplastic resin composition according to claim 1, wherein said polyphenylene ether resin (A) is a graft-modified polyphenylene ether resin.

15. A thermoplastic resin composition according to claim 1, wherein said first rubber is a polybutadiene rubber or a styrene-butadiene copolymer rubber.

16. A thermoplastic resin composition according to claim 1, wherein said composition has a melt flow rate greater than about 28 g/10 min measured at 280° C. with 10 kg loading according to JIS K 7210.

17. A molded article comprising a thermoplastic resin composition according to claim 1.

18. A molded article prepared by melt-kneading the thermoplastic resin composition according to claim 1.

19. A thermoplastic resin composition comprising:

(A) 1 to 99% by weight of a polyphenylene ether resin, (B) 99 to 1% by weight of a branched polystyrene resin or a branched polystyrene resin that has been rubber-modified with a first rubber, said branched polystyrene resin having a weight average molecular weight of about 150,000–1,000,000 and a number of branching points in the z-average molecular weight of about 2–15, wherein the individual percentages of (A) and (B) are with respect to the total amount of (A) and (B), and said percentages of (A) and (B) total 100 percent, (C) 0 to 100 parts by weight of a second rubber per 100 parts by weight of the total amount of (A) and (B), wherein, for purposes of calculating parts by weight of (C), when (B) is a rubber-modified polystyrene resin, said percentage of (B) excludes the amount of said first rubber, and the amount of said first rubber is added to the amount of said second rubber.

20. A thermoplastic resin composition according to claim 19, wherein the amount of said (A) is between about 20–80 weight and the amount of said (B) is between about 80–20 weight percent, both amounts relative to the sum of the amounts of (A) and (B), wherein the amounts of (A) and (B) total 100%.

* * * * *